United States Patent
Kim et al.

(10) Patent No.: US 12,428,084 B2
(45) Date of Patent: Sep. 30, 2025

(54) SYSTEM FOR ASSEMBLING A DOOR FOR A VEHICLE

(71) Applicants: HYUNDAI MOTOR COMPANY, Seoul (KR); KIA CORPORATION, Seoul (KR)

(72) Inventors: Sung Jong Kim, Seoul (KR); Young Taek Kwon, Anyang-si (KR); Yong Soo Cho, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/652,168

(22) Filed: May 1, 2024

(65) Prior Publication Data
US 2025/0187685 A1    Jun. 12, 2025

(30) Foreign Application Priority Data
Dec. 8, 2023  (KR) ........................ 10-2023-0178079

(51) Int. Cl.
| | | |
|---|---|---|
| *B62D 65/06* | (2006.01) | |
| *B23P 21/00* | (2006.01) | |
| *B25J 15/02* | (2006.01) | |
| *B62D 65/02* | (2006.01) | |

(52) U.S. Cl.
CPC .................. *B62D 65/06* (2013.01)

(58) Field of Classification Search
CPC .... B62D 65/06; B62D 65/022; B62D 65/028; B23P 21/00; B25J 15/0206
See application file for complete search history.

(56) References Cited

U.S. PATENT DOCUMENTS

| | | | | |
|---|---|---|---|---|
| 10,105,853 | B1 * | 10/2018 | Hwang | B25J 15/0206 |
| 11,491,662 | B2 * | 11/2022 | Hwang | B62D 65/06 |
| 11,685,454 | B2 * | 6/2023 | Nakano | G01B 11/022 |
| | | | | 29/897.2 |
| 2009/0194922 | A1 * | 8/2009 | Lin | B25J 15/0052 |
| | | | | 901/41 |
| 2013/0113149 | A1 * | 5/2013 | Yeum | B23K 37/0443 |
| | | | | 269/60 |
| 2017/0050323 | A1 * | 2/2017 | Shi | B25J 15/0047 |
| 2022/0119057 | A1 * | 4/2022 | Nakano | B62D 65/06 |

FOREIGN PATENT DOCUMENTS

| | | | | | |
|---|---|---|---|---|---|
| CN | 108238128 B | * | 8/2022 | | B23P 19/04 |
| JP | 2018192549 A | * | 12/2018 | | |
| JP | 2020132055 A | * | 8/2020 | | B62D 65/028 |
| JP | 2022143811 A | * | 10/2022 | | |
| JP | 2022143814 A | * | 10/2022 | | |

* cited by examiner

*Primary Examiner* — Bayan Salone
(74) *Attorney, Agent, or Firm* — Lempia Summerfield Katz LLC

(57) ABSTRACT

A system for assembling a door for a vehicle includes: a door hanger configured to supply a door to be coupled to a vehicle body, a first alignment part provided on the door hanger and configured to align the door in a first reference orientation preset based on a longitudinal direction of the vehicle body, and a transfer unit configured to extract the door from the door hanger and transfer the door to the vehicle body, thereby obtaining an advantageous effect of automating a process of assembling a door and improving productivity and production.

20 Claims, 15 Drawing Sheets

SYSTEM FOR ASSEMBLING A DOOR FOR A VEHICLE

CROSS-REFERENCE TO RELATED APPLICATION

This application claims priority to and the benefit of Korean Patent Application No. 10-2023-0178079 filed in the Korean Intellectual Property Office on Dec. 8, 2023, the entire contents of which are incorporated herein by reference.

TECHNICAL FIELD

The present disclosure relates to a system for assembling a door for a vehicle, and more particularly, to a system for assembling a door for a vehicle, which is capable of automating and simplifying a process of assembling a door, and improving productivity and production efficiency.

BACKGROUND

In general, a vehicle is assembled in a mass-production line by a large number of processes of assembling and welding about 20,000 components.

Recently, various attempts have been made to automate a process of assembling a vehicle using a robot system in order to reduce costs and improve productivity and production efficiency.

For example, recently, various attempts have been made to automate a process of assembling or coupling a door to a vehicle body using the robot system.

However, in the related art, because vehicle doors have atypical shapes and structures in accordance with the types of vehicles to which they are coupled, it is difficult to standardize the process of assembling or coupling the door to a vehicle body. Further, it is necessary to change and modify the automation equipment, for coupling a door to a vehicle body, in accordance with the types and structures of the doors, which is very disadvantageous in terms of logistical flexibility and increases facility investment costs.

In particular, in the related art, there is a problem in that the positional precision of the door deteriorates because of an increase in cumulative dispersion and deformation of a door hanger used to supply the doors during the process of assembling the doors. Further, there is a problem in that it is difficult to automate the process of assembling or coupling the door to the vehicle body because of deterioration in stability in removing and loading the door (deterioration in precision in assembling the door) caused by the deformation and cumulative dispersion.

Therefore, recently, various studies have been conducted to automate the process of assembling or coupling the door to the vehicle body and improve productivity and production efficiency, but the study results are still insufficient.

The statements in this BACKGROUND section merely provide background information related to the present disclosure and may not constitute prior art.

SUMMARY

The present disclosure provides a system for assembling or coupling a door to a vehicle body, which is capable of automating a process of assembling or coupling a door to a vehicle body, thus improving productivity and production efficiency.

In particular, the present disclosure has been made in an effort to provide positional precision of the door and automate the process of assembling or coupling the door to the vehicle body even though or when a door hanger is deformed and a cumulative dispersion is increased.

Among other things, the present disclosure has been made in an effort to optimize orientations of the door for removing (e.g., gripping) and loading the door and improve precision in assembling or coupling the door to a vehicle body even though the door hanger is deformed and the cumulative dispersion is increased.

The present disclosure has also been made in an effort to standardize and automate the process of assembling or coupling a door to a vehicle body without being restricted by the type (e.g., shape) and structure of the door.

The present disclosure has also been made in an effort to automate a process of fastening a door connector and a process of structurally fastening the door to a vehicle body.

The present disclosure has also been made in an effort to simplify a structure and a manufacturing process and improve spatial utilization and a degree of design freedom.

The present disclosure has also been made in an effort to shorten the time required for the process of assembling or coupling the door to the vehicle body and reduce manufacturing costs.

The present disclosure has also been made in an effort to prevent the door from being erroneously assembled, reduce a defect rate, and improve stability and reliability.

The objects to be achieved by the embodiments are not limited to the above-mentioned objects, but also include objects or effects that may be understood from the solutions or embodiments described below.

In order to achieve the above-mentioned objects, an embodiment of the present disclosure provides a system for assembling a door for a vehicle, the system including: a door hanger configured to supply a door to be coupled to a vehicle body; a first alignment part provided on the door hanger and configured to align the door in a first reference orientation preset based on a longitudinal direction of the vehicle body; and a transfer unit configured to remove the door from the door hanger and transfer the door to the vehicle body.

This is to automate a process of assembling a door to a vehicle body and improve productivity and production efficiency.

In other words, in the related art, because the doors have atypical shapes and structures in accordance with the types of vehicles, it is difficult to standardize the process of assembling or coupling a door to a vehicle body. Further, it is necessary to change and modify the automation equipment in accordance with the types and structures of the doors, which is very disadvantageous in terms of logistics flexibility and facility investment costs.

In particular, in the related art, there is a problem in that the positional precision of the door deteriorates because of an increase in cumulative dispersion and deformation of a door hanger used to supply the doors during the process of assembling the doors. Further, there is a problem in that it is difficult to automate the process of assembling the door because of deterioration in stability in removing and loading the door (deterioration in precision in assembling the door) caused by the deformation and cumulative dispersion.

In contrast, in the embodiment of the present disclosure, the first alignment part may be provided on the door hanger, and the door may be removed from the door hanger in the state in which the door is aligned in advance in the first reference orientation by means of the first alignment part, such that the positional precision of the door may be ensured even though the door hanger is deformed and the cumulative dispersion is increased. Therefore, it is possible to improve the stability in removing (gripping) and loading the door (improve the precision in assembling the door) and to automate the process of assembling the door.

According to an embodiment of the present disclosure, the first alignment part may include: a first support member configured to support a first lateral end of the door at a longitudinal reference position preset based on the longitudinal direction of the vehicle body; and a second support member configured to be movable toward or away from a second lateral end of the door in the longitudinal direction of the vehicle body and support the second lateral end of the door. The first lateral end of the door may be aligned at the longitudinal reference position as the door is pressed by the second support member.

According to an embodiment of the present disclosure, the first support member and the second support member may be configured to be selectively movable upward or downward in a vertical direction.

According to an embodiment of the present disclosure, the first alignment part may align the door in the first reference orientation in a state in which the door is moved by the transfer unit to a preset reference height relative to the door hanger.

According to an embodiment of the present disclosure, the transfer unit may include: a gripper configured to grip the door; and a gripper transfer robot configured to transfer the gripper, which grips the door, to the vehicle body.

According to an embodiment of the present disclosure, the gripper may include: a lower end grip part configured to support a lower end of the door; and an upper end grip part configured to support an upper end of the door.

According to an embodiment of the present disclosure, the lower end grip part may include a mounting block on which the lower end of the door is mounted, and the upper end grip part may include a suction member configured to suck a door glass of the door.

According to an embodiment of the present disclosure, the system may include: a second alignment part provided on the gripper and configured to align the door in a second reference orientation preset based on a width direction of the vehicle body.

According to an embodiment of the present disclosure, the second alignment part may include: a support protrusion provided on the gripper and configured to support an outer surface of a lower end of the door at a widthwise reference position preset based on the width direction of the vehicle body; and a pressing member configured to be movable toward or away from an inner surface of the door in the width direction of the vehicle body and press an inner surface of the lower end of the door. The outer surface of the lower end of the door may be aligned at the widthwise reference position as the door is pressed by the pressing member.

According to an embodiment of the present disclosure, the system may include: a connector fastening unit provided on the gripper and configured to fasten a door connector, which is provided on the door, to a vehicle body connector provided on the vehicle body.

According to an embodiment of the present disclosure, the system may include: a connector holder provided on the door hanger and configured to support the door connector in a preset connector reference orientation, in which the connector fastening unit is configured to remove the door connector from the connector holder and fasten the door connector to the vehicle body.

According to an embodiment of the present disclosure, the connector fastening unit may include: a connector gripper configured to grip the door connector; and a connector transfer part configured to transfer the connector gripper, which grips the door connector, from the connector holder to the vehicle body connector.

According to an embodiment of the present disclosure, the connector gripper may include: a first grip part configured to support one end of the door connector; and a second grip part configured to be movable toward or away from the other end of the door connector and support the other end of the door connector.

According to an embodiment of the present disclosure, the connector gripper may be provided on a base connector frame, and the connector transfer part may include: a first cylinder configured to move the base connector frame in a first direction relative to the gripper; a second cylinder configured to move the base connector frame in a second direction intersecting the first direction; and a movement cylinder configured to move the base connector frame so that the door connector is inserted into the vehicle body connector.

According to an embodiment of the present disclosure, the connector transfer part may include a lifting cylinder configured to move the base connector frame upward or downward in a vertical direction.

According to an embodiment of the present disclosure, the system may include: a locking frame provided on the base connector frame and configured to be movable upward or downward and lock a locking pin of the door connector to the vehicle body connector.

According to an embodiment of the present disclosure, the system may include: a door fastening unit configured to fasten the door to the vehicle body.

According to an embodiment of the present disclosure, the door fastening unit may include: a fastening tool module configured to structurally fasten the door and the vehicle body; and a fastening tool transfer robot configured to transfer the fastening tool module while corresponding to a portion where the door is fastened to the vehicle body.

According to an embodiment of the present disclosure, the fastening tool module may include: a base fastening frame connected to the fastening tool transfer robot; a first fastening tool provided on the base fastening frame; a second fastening tool provided on the base fastening frame and configured to be movable toward or away from the first fastening tool; and a third fastening tool rotatably provided on the base fastening frame and configured to define a different fastening angle from the first fastening tool or the second fastening tool.

According to an embodiment of the present disclosure, the fastening tool module may include: a base fastening frame connected to the fastening tool transfer robot; a first fastening tool provided on the base fastening frame; a second fastening tool provided on the base fastening frame and configured to define the same fastening angle as the first fastening tool; a third fastening tool provided on the base fastening frame and configured to define the same fastening angle as the first fastening tool; and a fourth fastening tool configured to move rectilinearly provided on the base fastening frame and configured to selectively protrude from the base fastening frame while defining a different fastening angle from the first fastening tool.

Figure 1:
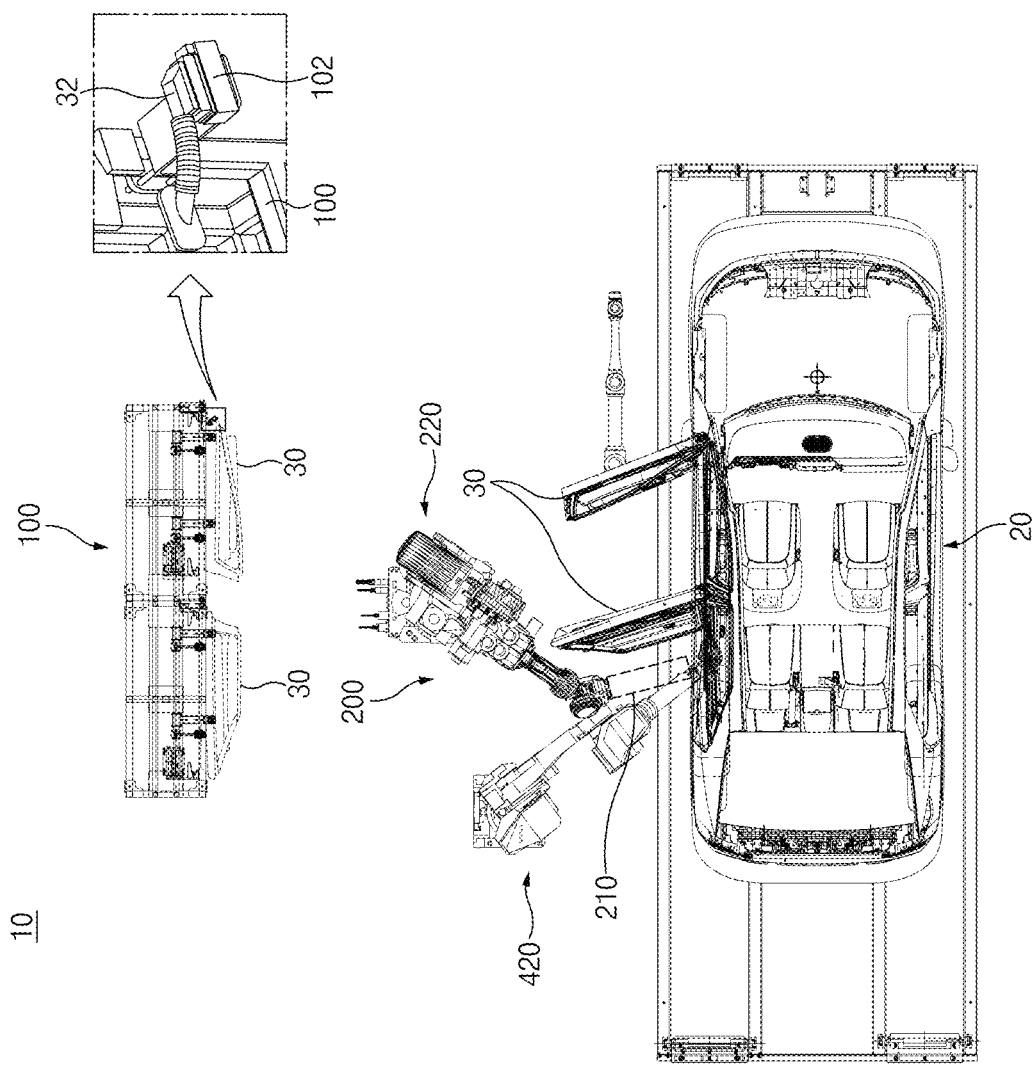
FIG. 1 is a view illustrating a system for assembling a door for a vehicle according to an embodiment of the present disclosure.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings.

However, the technical spirit or inventive concept of the present disclosure is not limited to the embodiments described herein, but instead may be implemented in various different forms. One or more of the constituent elements in the embodiments may be selectively combined and substituted for use within the scope of the technical spirit or inventive concept of the present disclosure.

In addition, unless otherwise specifically and explicitly defined and stated, the terms (including technical and scientific terms) used to describe the embodiments of the present disclosure should be construed as having the meaning commonly understood by a person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element. When a component, device, element, or the like of the present disclosure is described as having a purpose or performing an operation, function, or the like, the component, device, or element should be considered herein as being "configured to" meet that purpose or perform that operation or function.

With reference to FIGS. 1-15, a system 10 for coupling a door to a vehicle body according to an embodiment of the present disclosure includes: a door hanger 100 configured to supply or provide a door 30 to be coupled to a vehicle body 20, a first alignment part 110 provided on the door hanger 100 and configured to align the door 30 in a first preset reference orientation in a longitudinal direction of the vehicle body 20, and a transfer unit 200 configured to remove the door 30 from the door hanger 100 and transfer the door 30 to the vehicle body 20.

For reference, the system 10 for coupling a door to a vehicle body according to an embodiment of the present disclosure may be used to couple the doors 30 of various types of vehicles in accordance with required conditions and design specifications. The present disclosure is not restricted or limited by the type and structure of the door 30.

For example, the system 10 for assembling a door for a vehicle according to an embodiment of the present disclosure may be used for processes of assembling vehicles in a door-less manner (e.g., in a manner in which vehicle components are assembled to a vehicle body in a state in which a door is removed from or not coupled to the vehicle body, and then the door is subsequently coupled to the vehicle body).

For example, the process of assembling or coupling the door 30 to the vehicle body 20 may be performed by a step of removing the door 30 from the door hanger 100 and transferring the door 30 to the vehicle body 20, a step of fastening (connecting) a door connector 32 to a vehicle body connector 22, and a step of structurally fastening the vehicle body 20 and the door 30 (structurally fastening the vehicle body and the door by means of a door hinge and a door checker).

Figure 2:
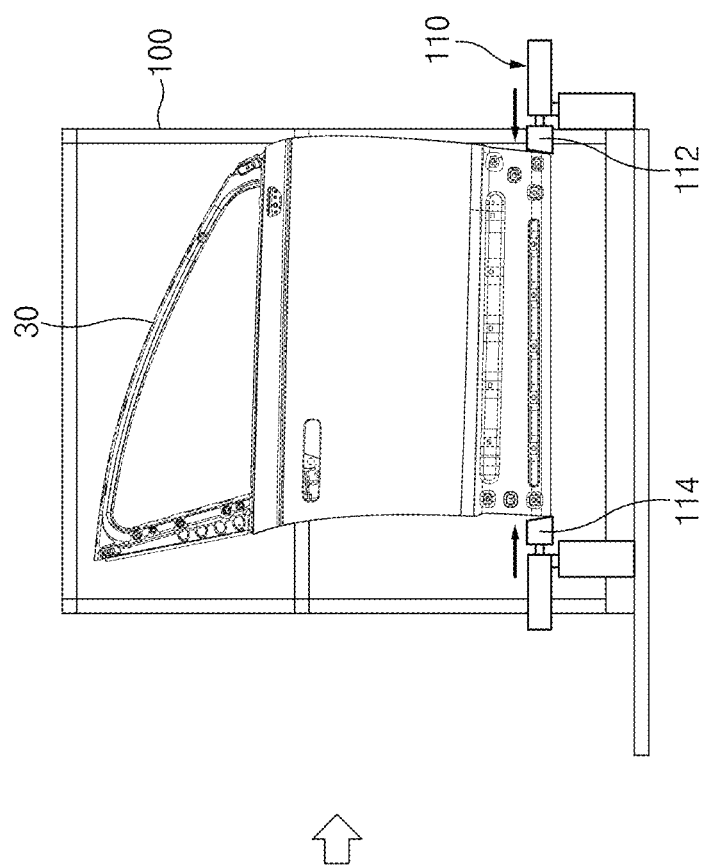
FIG. 2 is a view illustrating a first alignment part of the system for assembling a door for a vehicle according to the embodiment of the present disclosure.
Figure 2:
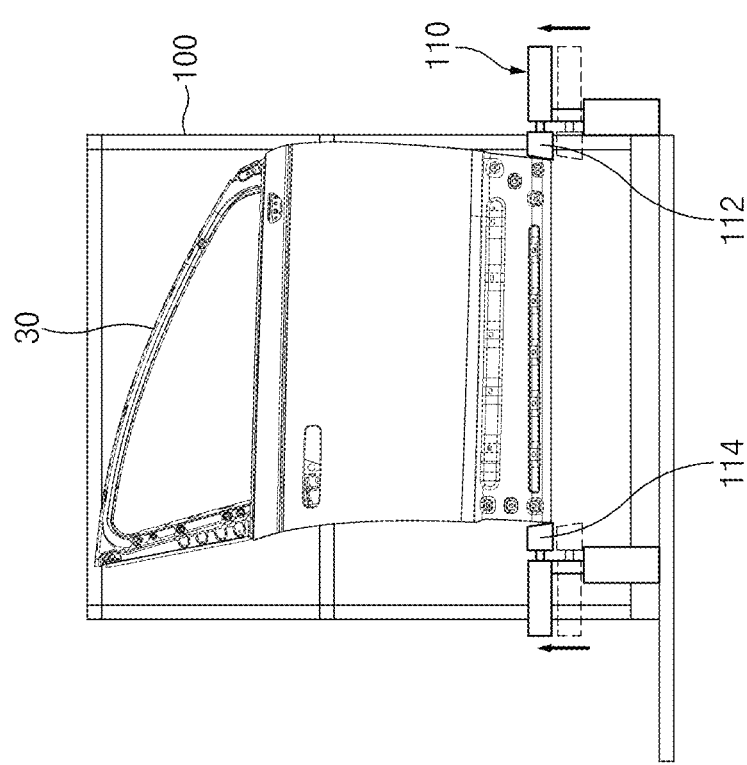

With reference to FIGS. 1 and 2, the door hanger 100 is configured to supply or provide (e.g., transport) the door 30 to be coupled to the vehicle body 20.

The door hanger 100 may have various structures capable of transporting the door 30. The present disclosure is not restricted or limited by the type and structure of the door hanger 100.

For example, the door hanger 100 may have an approximately quadrilateral or quadrangular frame structure. A pair of doors 30 may be supported in an upright state on the door hanger 100. Alternatively, only a single door 30 may be supplied or provided on the door hanger 100.

The first alignment part 110 is provided on the door hanger 100 and is configured to align the door 30 in the first reference orientation preset based on the longitudinal direction of the vehicle body 20 (e.g., a leftward/rightward direction based on FIG. 1).

This is based on the fact that when the door hanger 100 is deformed or the cumulative dispersion of the door hanger 100 is increased by an increase in frequency of use of the door hanger 100, it is difficult to maintain positional precision of the door 30, and the stability in removing the door 30 from the door hangar 100 and loading the door 30 onto the door hangar 100 deteriorates (e.g., and thus, precision in coupling the door to the vehicle body deteriorates).

In contrast, in an embodiment of the present disclosure, the first alignment part 110 is provided on the door hanger 100, and the door 30 is aligned in the first reference orientation using the first alignment part 110, such that the positional precision of the door 30 may be ensured even though or when the door hanger 100 is deformed or the cumulative dispersion is increased. Therefore, it is possible to obtain an advantageous effect of improving the stability or reliability of removing (e.g., by gripping) the door from the door hanger 100 and loading the door 30 (improving the precision in assembling the door).

In addition, according to an embodiment of the present disclosure, because the door 30 is aligned in the preset first reference orientation by means of the first alignment part 110, it is possible to omit a process of detecting an orientation of the door 30 (a position and angle of the door at which the door is normally gripped) before removing the door 30 from the door hanger 100 and transferring the door 30 to the vehicle body 20. For example, a detection process requiring a camera may be omitted. Therefore, it is possible to obtain an advantageous effect of simplifying the structure and assembling process, and thus, shortening the time required for the process of coupling the door 30 to the vehicle body 20.

The first alignment part 110 may have various structures capable of aligning the door 30 in the first reference orientation preset based on the longitudinal direction of the vehicle body 20. The present disclosure is not restricted or limited by the structure of the first alignment part 110.

According to an embodiment of the present disclosure, the first alignment part 110 may include a first support member 112 configured to support a first lateral end of the door 30 at a preset longitudinal reference position in the longitudinal direction of the vehicle body 20, and a second support member 114 configured to move toward or away from a second lateral end of the door 30 in the longitudinal direction of the vehicle body 20 and configured to support the second lateral end of the door 30. The first lateral end of the door 30 may be aligned at the longitudinal reference position as the door 30 is pressed by the second support member 114.

For example, the first support member 112 may be configured to support a right end (based on FIG. 2) of the door 30, and the second support member 114 may be configured to support a left end (based on FIG. 2) of the door 30.

In particular, the first support member 112 and the second support member 114 may be made of an elastic material such as rubber or urethane to minimize damage to (e.g., the risk of scratches on) the door 30 caused by the door 30 contacting the first support member 112 and the second support member 114.

The first support member 112 may have various structures capable of setting or defining the longitudinal reference position of the door 30 in the longitudinal direction of the vehicle body 20. Specifically, the first support member 112 may have various structures capable of defining the reference position at which the right end of the door is disposed. The present disclosure is not restricted or limited by the structure and shape of the first support member 112.

For example, the first support member 112 may be configured to move rectilinearly or horizontally from a standby position, at which the first support member 112 is spaced apart from the first lateral end (right end) of the door 30, to a support position at which the first support member 112 approaches or contacts the first lateral end (right end) of the door 30. For example, the first support member 112 may be configured to move from the standby position to the support position by driving power of a first driving source such as a pneumatic cylinder.

For reference, in the embodiment of the present disclosure illustrated and described above, the example has been described in which the first support member 112 is configured to move from the standby position to the support position. However, according to another embodiment of the present disclosure, the first support member may be configured to be fixed at a point adjacent to the first lateral end (right end) of the door.

The second support member 114 is configured to press the second lateral end (left end) of the door 30 so that the first lateral end (right end) of the door 30 is aligned at the longitudinal reference position. Specifically, the second support member 114 may be configured to press the door 30 such that the first lateral end of the door is in close contact with the first support member 112.

The second support member 114 may have various structures capable of pressing the second lateral end of the door 30 and moving the door 30 toward the first support member 112. The present disclosure is not restricted or limited by the structure and shape of the second support member 114.

For example, the second support member 114 may be configured to move rectilinearly or horizontally from a standby position, at which the second support member 114 is spaced apart from the second lateral end (left end) of the door 30, to a pressing position at which the second support member 114 approaches or contacts the second lateral end (left end) of the door 30. For example, the second support member 114 may be configured to move from the standby position to the pressing position by driving power of a second driving source such as a pneumatic cylinder.

The points in time at which the first support member 112 and the second support member 114 move may be variously changed in accordance with required conditions and design specifications. The present disclosure is not restricted or limited by the points in time at which the first support member 112 and the second support member 114 move.

In particular, in a state in which the first support member 112 supports the first lateral end of the door 30 first, the second support member 114 may press the second lateral end of the door 30.

More particularly, the magnitude of driving power applied to the first support member 112 may be large relative to the magnitude of driving power applied to the second support member 114. Accordingly, the first lateral end of the door 30 may not deviate from the longitudinal reference position (the first support member does not move from the support position) when the second support member 114 presses the second lateral end of the door 30.

According to an embodiment of the present disclosure, the first support member 112 and the second support member 114 may be configured to be selectively movable upward or downward in the vertical direction.

For example, the first support member 112 and the second support member 114 may be configured to be selectively moved in the vertical direction by a driving source such as a cylinder.

In particular, the first alignment part 110 may be lowered to a position below a height, at which the door 30 enters the door hanger 100, to prevent the first alignment part 110 (the first and second support members) from interfering with a movement route for the door 30. After the door hanger 100 reaches a working position (e.g., a position at which the door is transferred), the first alignment part 110 may move the door upward so as to return the door 30 to a height at which the door 30 may be aligned.

According to an embodiment of the present disclosure, the first alignment part 110 may be configured to align the door 30 in the first reference orientation in a state in which the door 30 is moved upward (raised) by the transfer unit 200 to a preset reference height with respect to the door hanger 100.

For example, in the state in which the door 30 is moved to the reference height, the door 30 may be disposed to be spaced apart from the door hanger 100 by 3 mm or more.

This is based on the fact that a positional precision deviation of the door 30, which is caused by the deformation of the door hanger 100 and the increase in cumulative dispersion of the door hanger 100, occurs not only in the longitudinal direction of the vehicle body 20 but also in the vertical direction. In an embodiment of the present disclosure, the door 30 is aligned in the longitudinal direction of the vehicle body 20 (aligned in the first reference orientation) in the state in which the door 30 is moved to be spaced apart from the door hanger 100 at the preset reference height (in the state in which the door 30 is disposed at a height at which the cumulative dispersion of the door hanger may be absorbed). Therefore, it is possible to obtain an advantageous effect of ensuring the positional precision of the door 30 and optimizing the orientation of the door 30 in which the door 30 is removed (gripped) and loaded.

The transfer unit 200 is configured to remove the door 30 from the door hanger 100 and transfer the door 30 to the vehicle body 20 provided on an assembling line.

The transfer unit 200 may have various structures capable of removing the door 30 from the door hanger 100 and transferring the door 30. The present disclosure is not restricted or limited by the structure and operating method of the transfer unit 200.

According to an embodiment of the present disclosure, the transfer unit 200 may include a gripper 210 configured to grip or grasp the door 30, and a gripper transfer robot 220 configured to transfer the gripper 210, which grips the door 30, to the vehicle body 20.

In this case, the configuration in which the gripper 210 grips the door 30 may be defined as a configuration in which the gripper 210 holds or supports the door 30 in a state in which the gripper 210 may transfer or move the door 30.

The gripper 210 may grip the door 30 in various ways in accordance with required conditions and design specifications. The present disclosure is not restricted or limited by the type and structure of the gripper 210.

According to an embodiment of the present disclosure, the gripper 210 may include a lower end grip part 212 configured to support a lower end of the door 30 based on a vertical direction, and an upper end grip part 214 configured to support an upper end of the door 30 based in the vertical direction.

According to an embodiment of the present disclosure, the lower end grip part 212 may include a mounting block 212a on which the lower end of the door 30 is mounted.

The mounting block 212a may have various structures capable of supporting the lower end of the door 30. The present disclosure is not restricted or limited by the structure and shape of the mounting block 212a.

For example, the mounting block 212a may be provided in the form of an approximately quadrangular block. When the lower end of the door 30 is seated on an upper surface of the mounting block 212a, the lower end of the door 30 may be mounted on the mounting block 212a by the weight of the door 30.

For example, the lower end grip part 212 may include a plurality of mounting blocks 212a disposed to be spaced apart from one another at predetermined intervals.

In the embodiments of the present disclosure illustrated and described above, the example has been described in which the lower end of the door 30 is mounted on the lower end grip part 212 by the weight of the door 30. However, according to another embodiment of the present disclosure, the lower end grip part may press (e.g., grasp) the lower end of the door or hold (support) the lower end of the door by other methods.

According to an embodiment of the present disclosure, the upper end grip part 214 may include suction members 214a configured to suck a door glass 31 of the door 30.

The suction member 214a may have various structures capable of being coupled to a surface of the door glass 31 by vacuum suction. The present disclosure is not restricted or limited by the structure and number of the suction member 214a.

Hereinafter, an example in which the upper end grip part 214 includes a total of two suction members 214a each having an approximately circular plate shape is described.

In the embodiment of the present disclosure illustrated and described above, the example is described in which the upper end grip part 214 supports the upper end (door glass) of the door 30 by suction. However, according to another embodiment of the present disclosure, the upper end grip part may be configured to hold the upper end of the door by attachment, pressing, or other methods.

In addition, in the embodiment of the present disclosure illustrated and described above, the example is described in which the upper end grip part 214 supports the door glass 31. However, according to another embodiment of the present disclosure, the upper end grip part may be configured to support a door panel or another portion of the door 30.

According to an embodiment of the present disclosure, the gripper 210 may include a guide roller 216 configured to support an inner surface of the door 30 while being in rolling contact with the inner surface of the door 30.

For example, two guide rollers 216 may be respectively provided at upper and lower ends of the gripper 210. The plurality of guide rollers 216 may collectively support the inner surface of the door 30.

Figure 3:
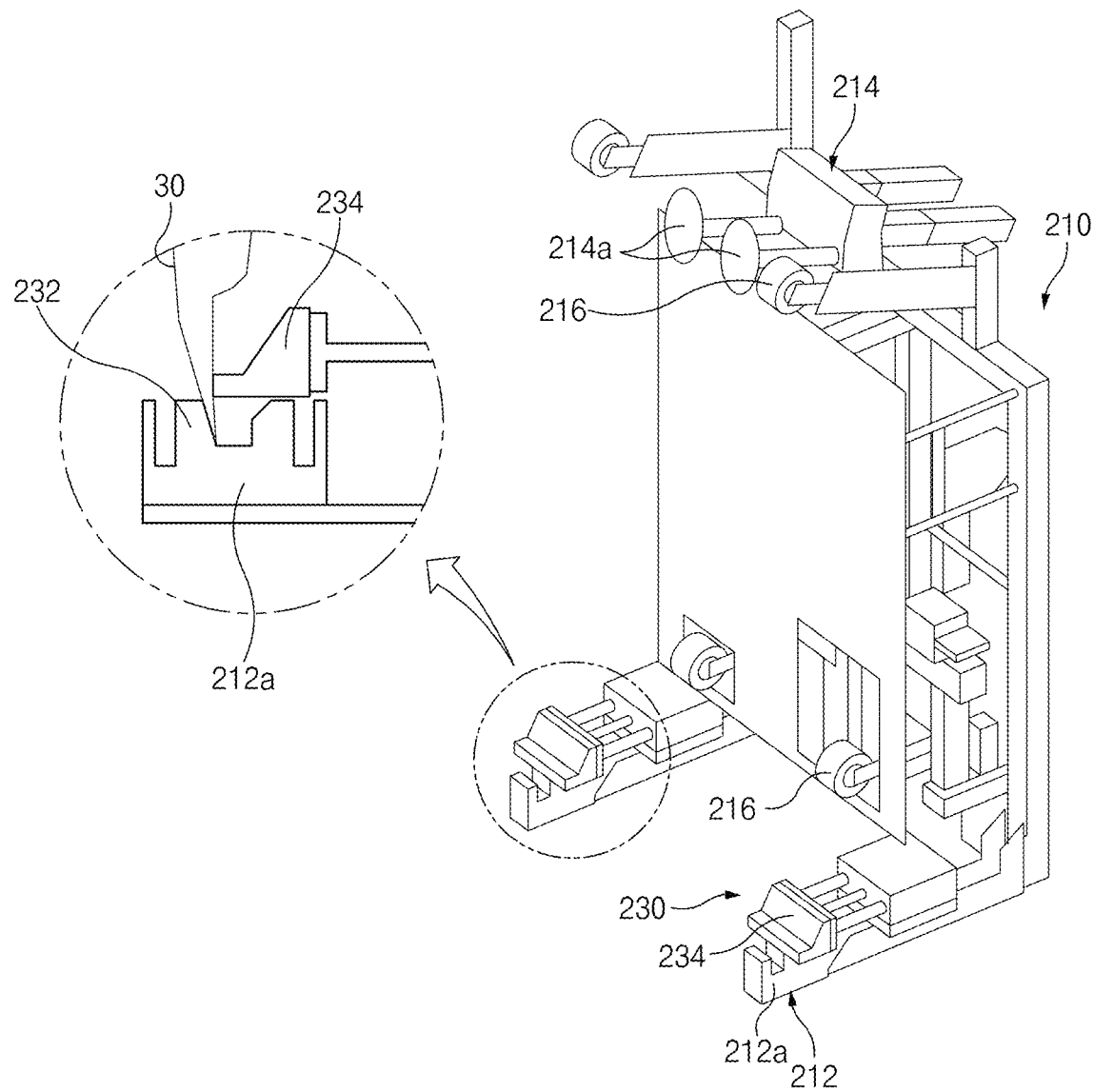
FIG. 3 is a view illustrating a second alignment part of the system for assembling a door for a vehicle according to the embodiment of the present disclosure.
Figure 4:
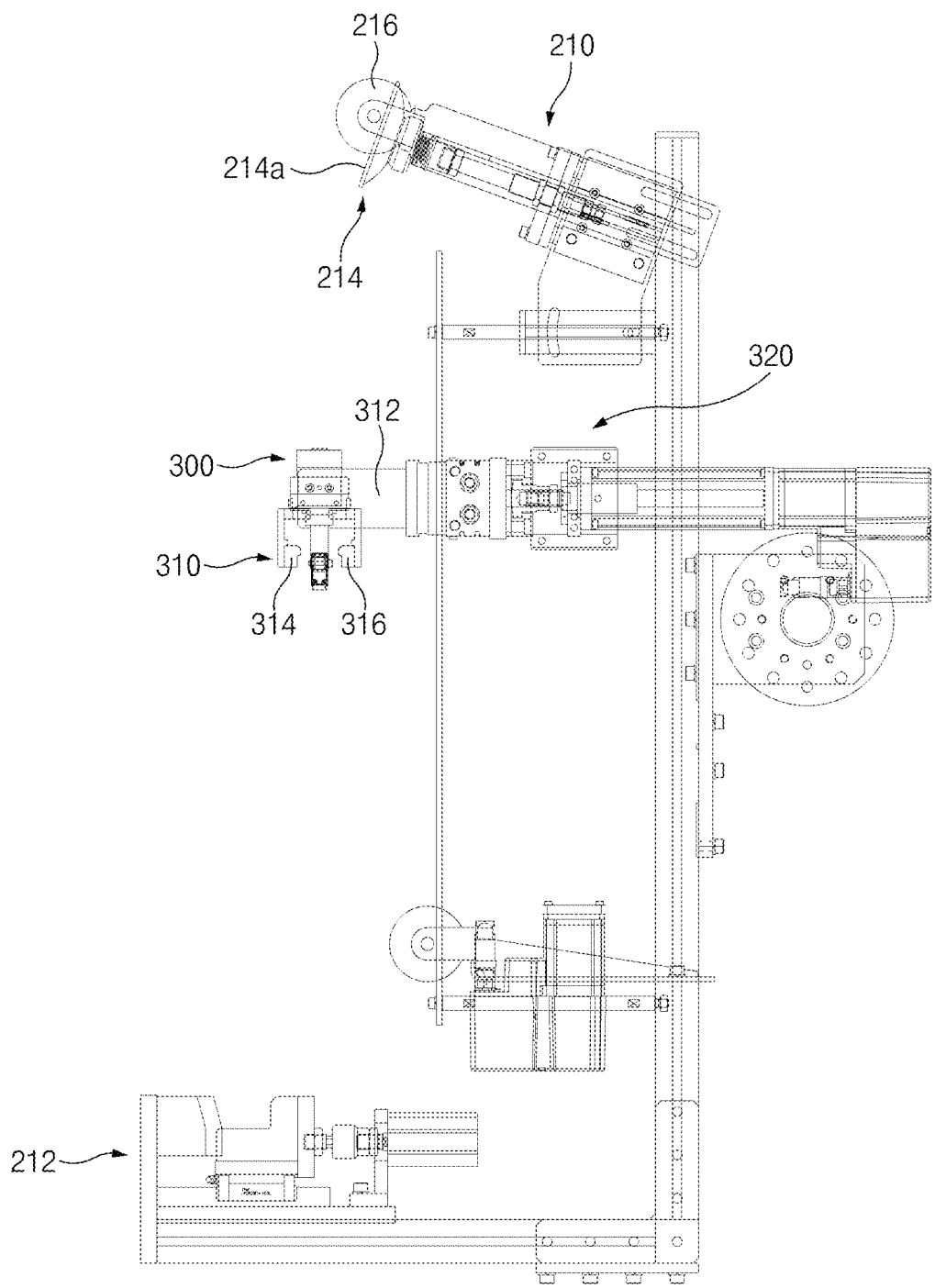
FIGS. 4 and 5 are top plan views illustrating a gripper of the system for assembling a door for a vehicle according to the embodiment of the present disclosure.
Figure 5:
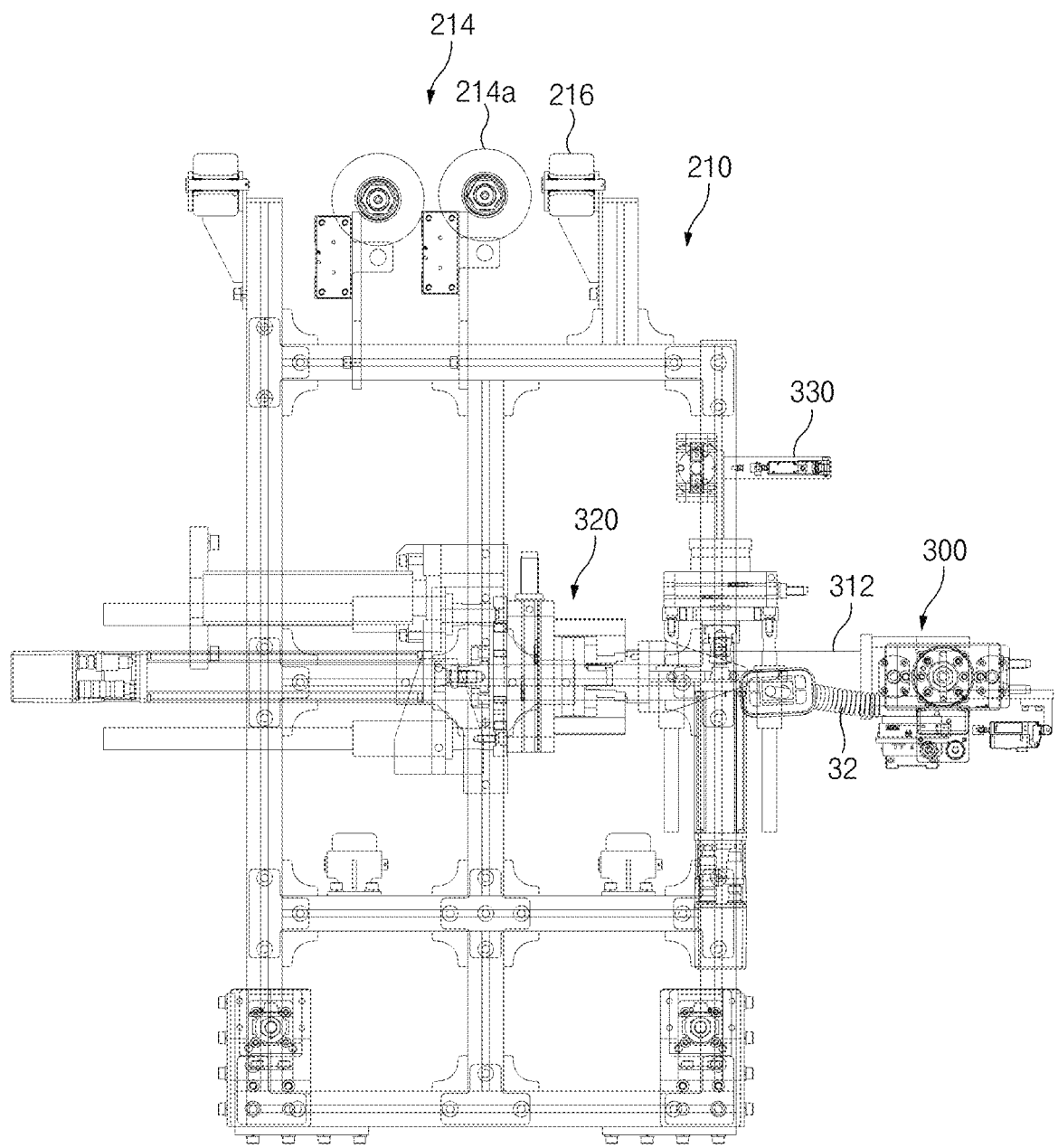
Figure 6:
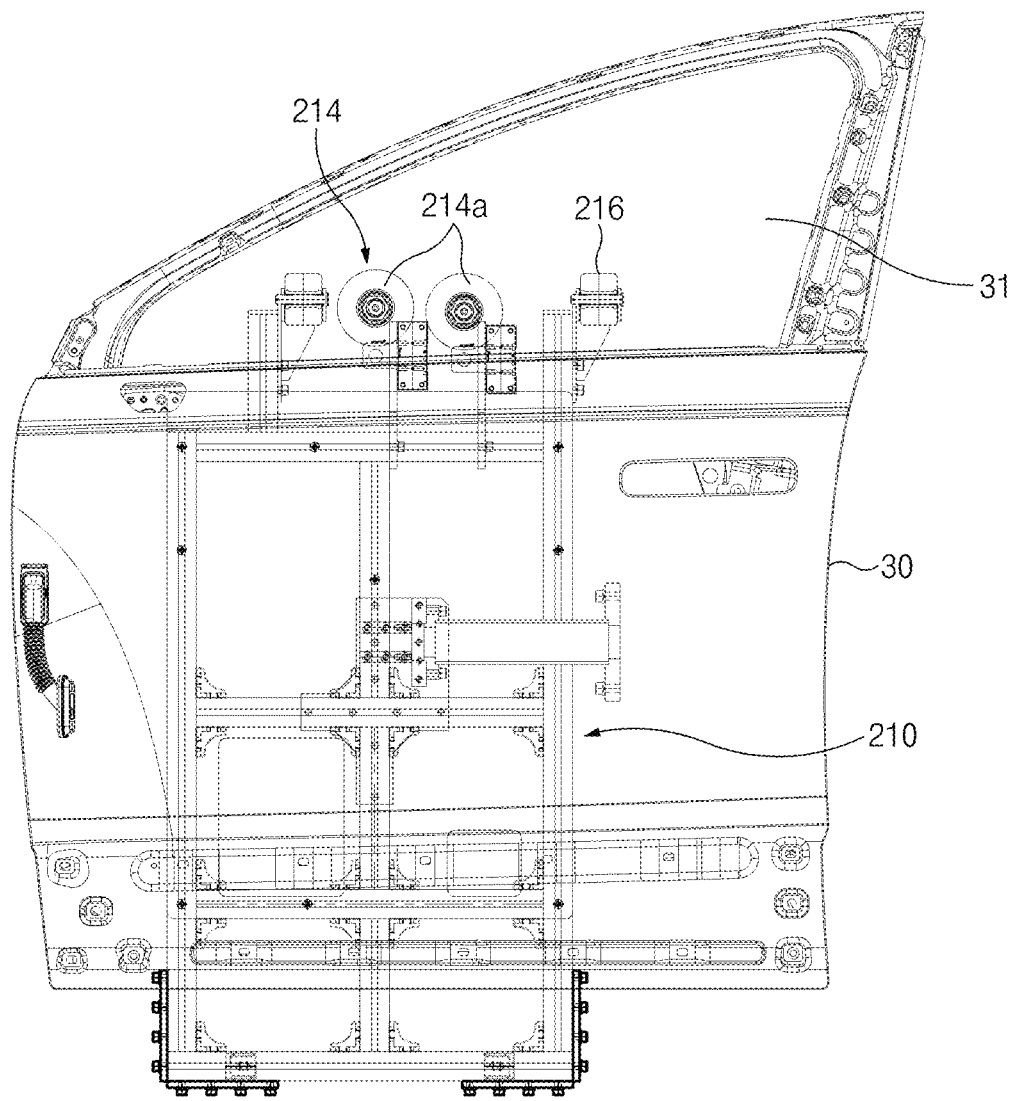
FIG. 6 is a view illustrating a gripped state of a door in the system for assembling a door for a vehicle according to the embodiment of the present disclosure.
Figure 7:
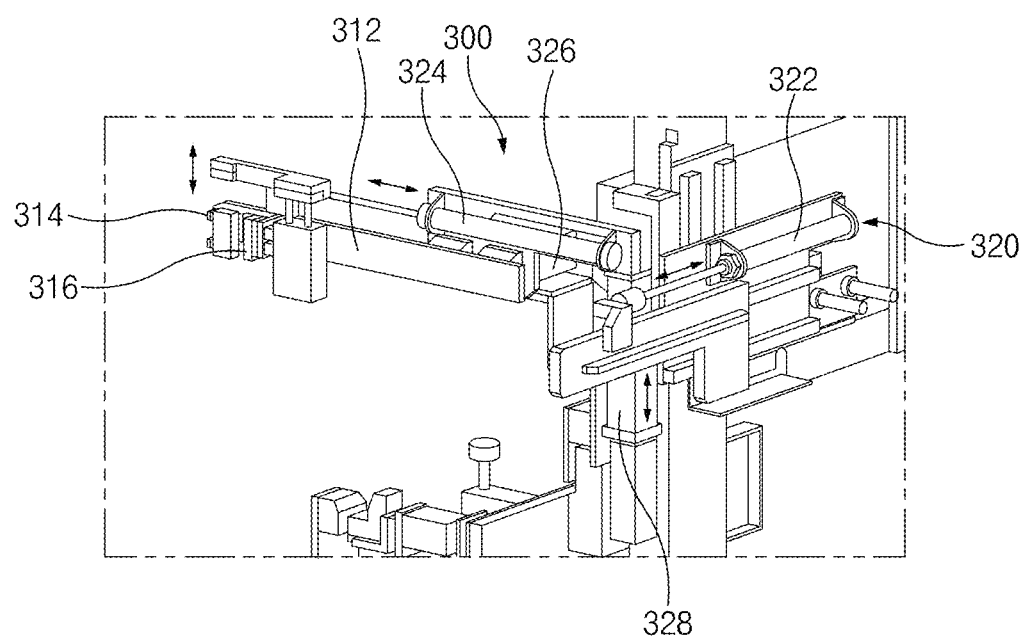
FIG. 7 is a view illustrating a connector fastening unit of the system for assembling a door for a vehicle according to the embodiment of the present disclosure.
Figure 8:
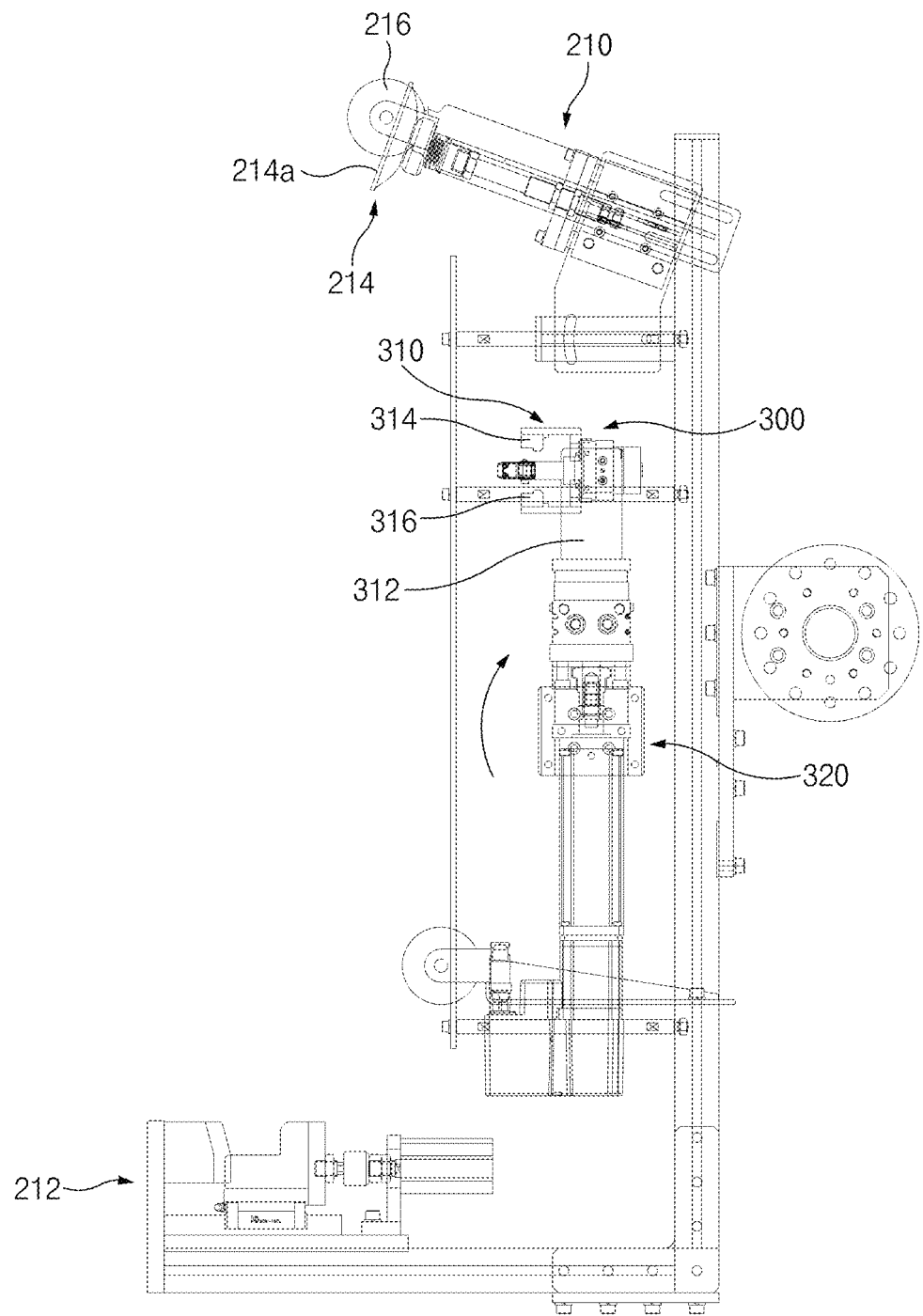
FIG. 8 is a view illustrating a connector gripper of the system for assembling a door for a vehicle according to the embodiment of the present disclosure.

With reference to FIG. 3, according to an embodiment of the present disclosure, the system 10 for assembling a door for a vehicle may include a second alignment part 230 provided on the gripper 210 and configured to align the door 30 in a preset second reference orientation in a width direction of the vehicle body 20.

This is based on the fact that deviation in the positional precision of the door 30, which is caused by the deformation of the door hanger 100 and an increase in cumulative dispersion of the door hanger 100, occurs not only in the longitudinal direction of the vehicle body 20 but also in the width direction of the vehicle body 20 (e.g., the leftward/rightward direction of the vehicle body), which causes deterioration in stability or reliability in removing and loading the door 30 (e.g., a deterioration in precision in coupling the door 30 to the vehicle body 20).

In contrast, in the embodiments of the present disclosure, the second alignment part 230 is provided on the gripper 210, and the door 30 is aligned in the second reference orientation in the width direction of the vehicle body 20 by means of the second alignment part 230, such that the positional precision of the door 30 may be ensured even though the door hanger 100 is deformed or the cumulative dispersion (the cumulative dispersion in the width direction of the vehicle body) is increased. Therefore, it is possible to obtain an advantageous effect of further improving stability or reliability in removing (e.g., gripping) and loading the door 30 (improving precision in assembling the door).

The second alignment part 230 may have various structures capable of aligning the door 30 in the second reference orientation preset based on the width direction of the vehicle body 20 (the vertical direction based on FIG. 1). The present disclosure is not restricted or limited by the structure of the second alignment part 230.

According to an embodiment of the present disclosure, the second alignment part 230 may include a support protrusion 232 provided on the gripper 210 and configured to support an outer surface of the lower end of the door 30 at a widthwise reference position preset based on the width direction of the vehicle body 20. Additionally or alternatively, the second alignment part 230 may include a pressing member 234 configured to move toward or away from the inner surface of the door 30 in the width direction of the vehicle body 20 and configured to press an inner surface of the lower end of the door 30. The outer surface of the lower end of the door 30 may be aligned at the widthwise reference position as the door 30 is pressed by the pressing member 234.

In particular, the support protrusion 232 and the pressing member 234 may be made of an elastic material such as rubber and urethane to minimize damage to (e.g., scratches on) the door 30 caused by contact with the support protrusion 232 and the pressing member 234.

The support protrusion 232 may have various structures capable of setting or defining the widthwise reference position in the width direction of the vehicle body 20. The present disclosure is not restricted or limited by the structure and shape of the second support member 114.

For example, the support protrusion 232 may be integrated with the mounting block 212*a* and protrude from an upper surface of the mounting block 212*a*.

For reference, in the embodiment of the present disclosure illustrated and described above, the example has been described in which the support protrusion 232 is integrally fixed to the mounting block 212*a*. However, according to another embodiment of the present disclosure, the support protrusion may be configured to move rectilinearly or horizontally from a standby position, at which the support protrusion is spaced apart from the outer surface of the lower end of the door, to a support position at which the support protrusion approaches or contacts the outer surface of the lower end of the door.

The pressing member 234 is configured to press the inner surface of the lower end of the door 30 so that the outer surface of the lower end of the door 30 is aligned at the widthwise reference position (the outer surface of the lower end of the door is in close contact with the support protrusion 232).

The pressing member 234 may have various structures capable of pressing the inner surface of the lower end of the door 30 and moving the door 30 in the direction toward the support protrusion 232. The present disclosure is not restricted or limited by the structure and shape of the pressing member 234.

For example, the pressing member 234 may be configured to move rectilinearly or horizontally from a standby position, at which the pressing member 234 is spaced apart from the inner surface of the lower end of the door 30, to a pressing position at which the pressing member 234 approaches or contacts the inner surface of the lower end of the door 30. For example, the pressing member 234 may be configured to be moved from the standby position to the pressing position by driving power of a third driving source such as a pneumatic cylinder.

The gripper transfer robot 220 is configured to transfer the gripper 210, which grips the door 30, to the vehicle body 20.

A typical multi-axis robot capable of transferring the gripper 210 in an X-axis direction, a Y-axis direction, and a Z-axis direction may be used as the gripper transfer robot 220. The present disclosure is not restricted or limited by the type and structure of the gripper transfer robot 220.

With the above-mentioned structure, the door 30, which is supplied to the door hanger 100, may be aligned in advance in the first and second reference orientations by means of the first and second alignment parts 110 and 230 before the door 30 is removed from the door hanger 100. The gripper transfer robot 220 may remove the door 30 from the door hanger 100 and transfer the door 30 to a working position (an assembling position adjacent to the vehicle body).

With reference to FIGS. 3-11, according to an embodiment of the present disclosure, the system 10 for assembling a door for a vehicle may include a connector fastening unit 300 provided on the gripper 210 and configured to fasten the door connector 32 provided on the door 30 to the vehicle body connector 22 provided on the vehicle body 20.

The connector fastening unit 300 is configured to automatically fasten (connect) the door connector 32 (e.g., a male connector) to the vehicle body connector 22 (e.g., a female connector).

According to an embodiment of the present disclosure, the system 10 for assembling a door for a vehicle may include a connector holder 102 provided on the door hanger 100 and configured to support the door connector 32 in a preset connector reference orientation. The connector fastening unit 300 may remove the door connector 32 from the connector holder 102 and fasten the door connector 32 to the vehicle body 20 (see FIGS. 1 and 9).

As described above, in an embodiment of the present disclosure, the door connector 32 is disposed in the preset connector reference orientation on the door hanger 100 by means of the connector holder 102. Therefore, it is possible to obtain an advantageous effect of simplifying a process (e.g., a detecting process using a vision camera) of detecting the orientation of the door connector 32 to grip the door connector 32 (detecting a position and angle of the door connector to grip the door connector) and shortening the time required for the detection process.

The connector fastening unit 300 may have various structures capable of automatically fastening (connecting) the door connector 32 to the vehicle body connector 22. The present disclosure is not restricted or limited by the structure of the connector fastening unit 300.

According to an embodiment of the present disclosure, the connector fastening unit 300 may include a connector gripper 310 configured to grip the door connector 32, and a connector transfer part 320 configured to transfer the connector gripper 310, which grips the door connector 32, from the connector holder 102 to the vehicle body connector 22.

The connector gripper 310 may have various structures capable of gripping the door connector 32. The present disclosure is not restricted or limited by the structure and operating method of the connector gripper 310.

In this case, the configuration in which the connector gripper 310 grips the door connector 32 may be defined as a configuration in which the connector gripper 310 holds (supports) the door connector 32 in a state in which the connector gripper 310 may transfer or move the door connector 32.

According to an embodiment of the present disclosure, the connector gripper 310 may include a first grip part 314 configured to support one end of the door connector 32, and a second grip part 316 configured to move toward or away from the other end of the door connector 32 and configured to support the other end of the door connector 32.

For example, the first grip part 314 may be configured to support a right end (based on FIG. 9) of the door connector 32, and the second grip part 316 may be configured to support a left end (based on FIG. 9) of the door connector 32.

In particular, the first grip part 314 and the second grip part 316 may be made of an elastic material such as rubber and urethane to minimize damage to and a slip of the door connector 32 caused by contact with the first grip part 314 and the second grip part 316.

The first grip part 314 and the second grip part 316 may each have various structures capable of supporting one end and the other end of the door connector 32. The present disclosure is not restricted or limited by the structures and shapes of the first grip part 314 and the second grip part 316.

For example, the first grip part 314 and the second grip part 316 may be provided on a base connector frame 312 while collectively defining an approximately "U" shape. The door connector 32 may be gripped by the connector gripper 310 by being pressed between the first grip part 314 and the second grip part 316.

For example, the second grip part 316 may be configured to move rectilinearly or horizontally from a standby position, at which the second grip part 316 is spaced apart from the other end of the door connector 32, to a pressing position at which the second grip part 316 approaches or contacts the other end of the door connector 32.

The second grip part 316 may be configured to be moved from the standby position to the pressing position by driving power of a driving source such as a pneumatic cylinder. The present disclosure is not restricted or limited by the operating method of the second grip part 316.

The connector transfer part 320 may have various structures capable of transferring the connector gripper 310 in the X-axis direction, the Y-axis direction, and the Z-axis direction. The present disclosure is not restricted or limited by the structure and operating method of the connector transfer part 320.

In particular, a transfer route for the connector gripper 310 may be appropriately changed in the X-axis direction, the Y-axis direction, and the Z-axis direction in accordance with required conditions and design specifications to prevent the connector transfer part 320 from interfering with a peripheral component (e.g., a door fastening unit).

According to an embodiment of the present disclosure, the connector transfer part 320 may include a first cylinder 322 configured to move the base connector frame 312 in a first direction (e.g., the X-axis direction) relative to the gripper 210, a second cylinder 324 configured to move the base connector frame 312 in a second direction (e.g., the Y-axis direction) intersecting the first direction, and a movement cylinder 326 configured to move the base connector frame 312 so that the door connector 32 is inserted into the vehicle body connector 22.

Typical pneumatic cylinders or servo-cylinders may be used as the first cylinder 322, the second cylinder 324, and the movement cylinder 326. The present disclosure is not restricted or limited by the types and properties of the first cylinder 322, the second cylinder 324, and the movement cylinder 326.

According to an embodiment of the present disclosure, the connector transfer part 320 may include a lifting cylinder 328 configured to selectively raise or lower the base connector frame 312 in the vertical direction (e.g., the Z-axis direction).

As described above, in an embodiment of the present disclosure, a height of the base connector frame 312 may be changed by the lifting cylinder 328. Therefore, it is possible to selectively adjust a gripping height (e.g., loading height) and a fastening height of the door connector 32 depending on the type of vehicle.

Figure 9:
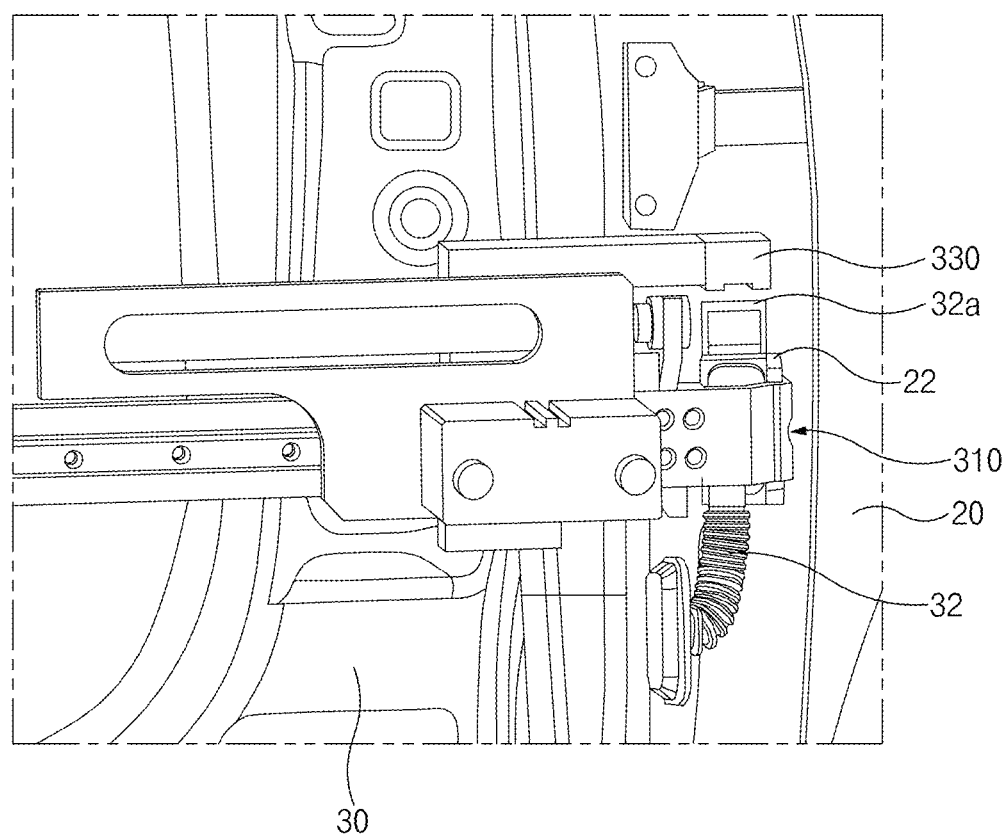
FIG. 9 is a view illustrating a door connector of the system for assembling a door for a vehicle according to the embodiment of the present disclosure.
Figure 10:
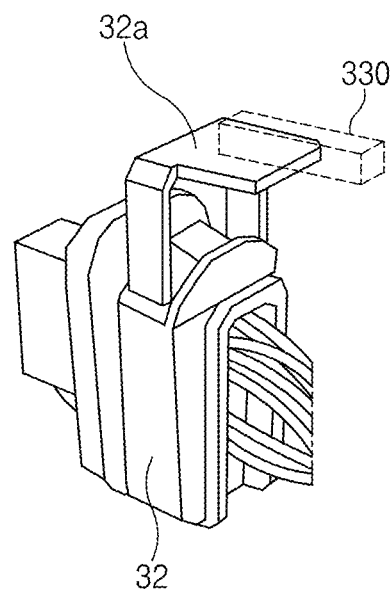
FIGS. 10 and 11 are views illustrating a process of fastening a locking pin of the system for assembling a door for a vehicle according to the embodiment of the present disclosure.
Figure 11:
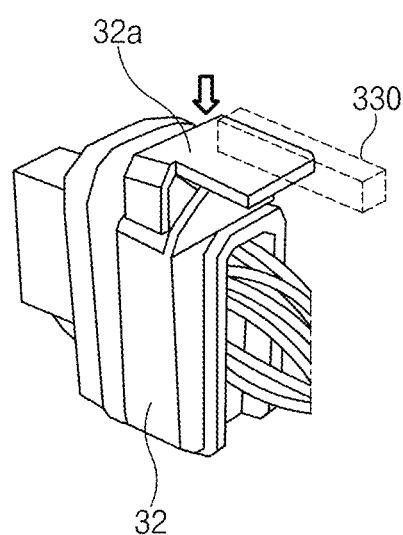
Figure 12:
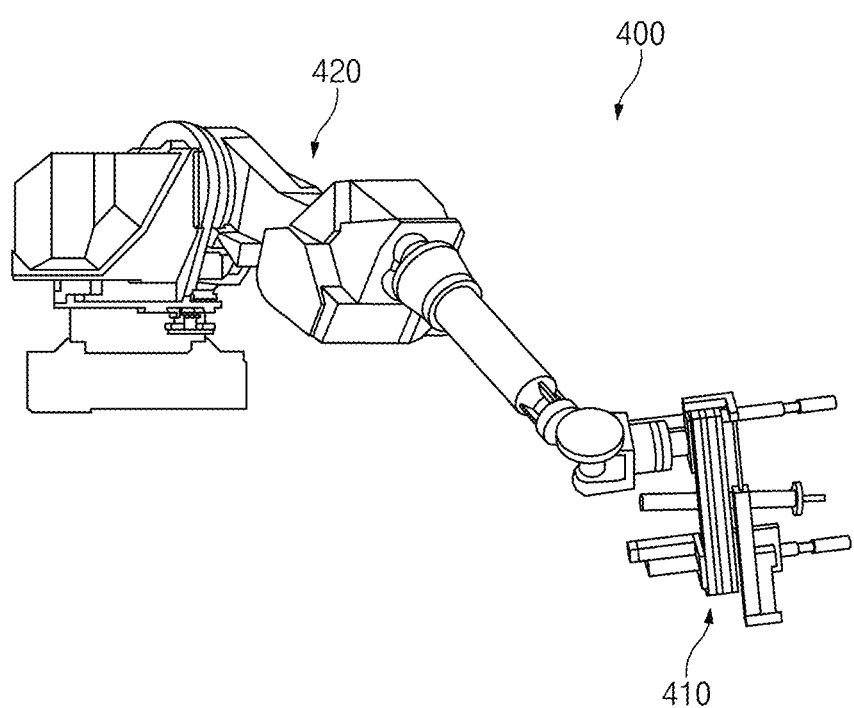
FIG. 12 is a view illustrating a door fastening unit of the system for assembling a door for a vehicle according to the embodiment of the present disclosure.

With reference to FIGS. 9-11, according to an embodiment of the present disclosure, the system 10 for assembling a door for a vehicle may include a locking frame 330 provided on the base connector frame 312 and configured to be movable upward and downward and lock a locking pin 32a of the door connector 32 to the vehicle body connector 22.

For reference, the locking pin 32a of the door connector 32 serves to maintain or fix the state in which the door connector 32 is connected to the vehicle body connector 22. When the locking pin is pressed downward from above in the state in which the door connector 32 is connected to the vehicle body connector 22, an end of the locking pin is inserted into a restraint hole provided in the vehicle body connector, such that the state in which the door connector 32 is connected to the vehicle body connector 22 may be maintained.

For example, the locking frame 330 may be configured to be selectively moved upward or downward in the vertical direction by a driving source such as a cylinder.

With reference to FIGS. 1 and 12-15, according to an embodiment of the present disclosure, the system 10 for assembling a door for a vehicle may include a door fastening unit 400 configured to fasten the door 30 to the vehicle body 20.

The door fastening unit 400 may have various structures capable of fastening the door 30 and the vehicle body 20. The present disclosure is not restricted or limited by the type and structure of the door fastening unit 400.

According to an embodiment of the present disclosure, the door fastening unit 400 may include a fastening tool module 410 configured to structurally fasten the door 30 and the vehicle body 20, and a fastening tool transfer robot 420 configured to transfer the fastening tool module 410 while corresponding to a portion where the door 30 is to be fastened to the vehicle body 20.

The fastening tool module 410 is configured to structurally fasten the door 30 and the vehicle body 20.

In this case, the configuration in which the door 30 and the vehicle body 20 are structurally fastened is defined as a configuration in which the door 30 is rotatably and structurally connected or coupled to the vehicle body 20.

For example, the door 30 and the vehicle body 20 may be structurally fastened by means of a door hinge DH configured to support the door 30 so that the door 30 is rotatable relative to the vehicle body 20, and a door checker DC configured to support an opening angle of the door 30 with respect to the vehicle body 20. The fastening tool module 410 may be used to fasten the door checker and the door hinge to the vehicle body 20.

The fastening tool module 410 may be variously changed in structure in accordance with required conditions and design specifications. The present disclosure is not restricted or limited by the structure of the fastening tool module 410.

Figure 13:
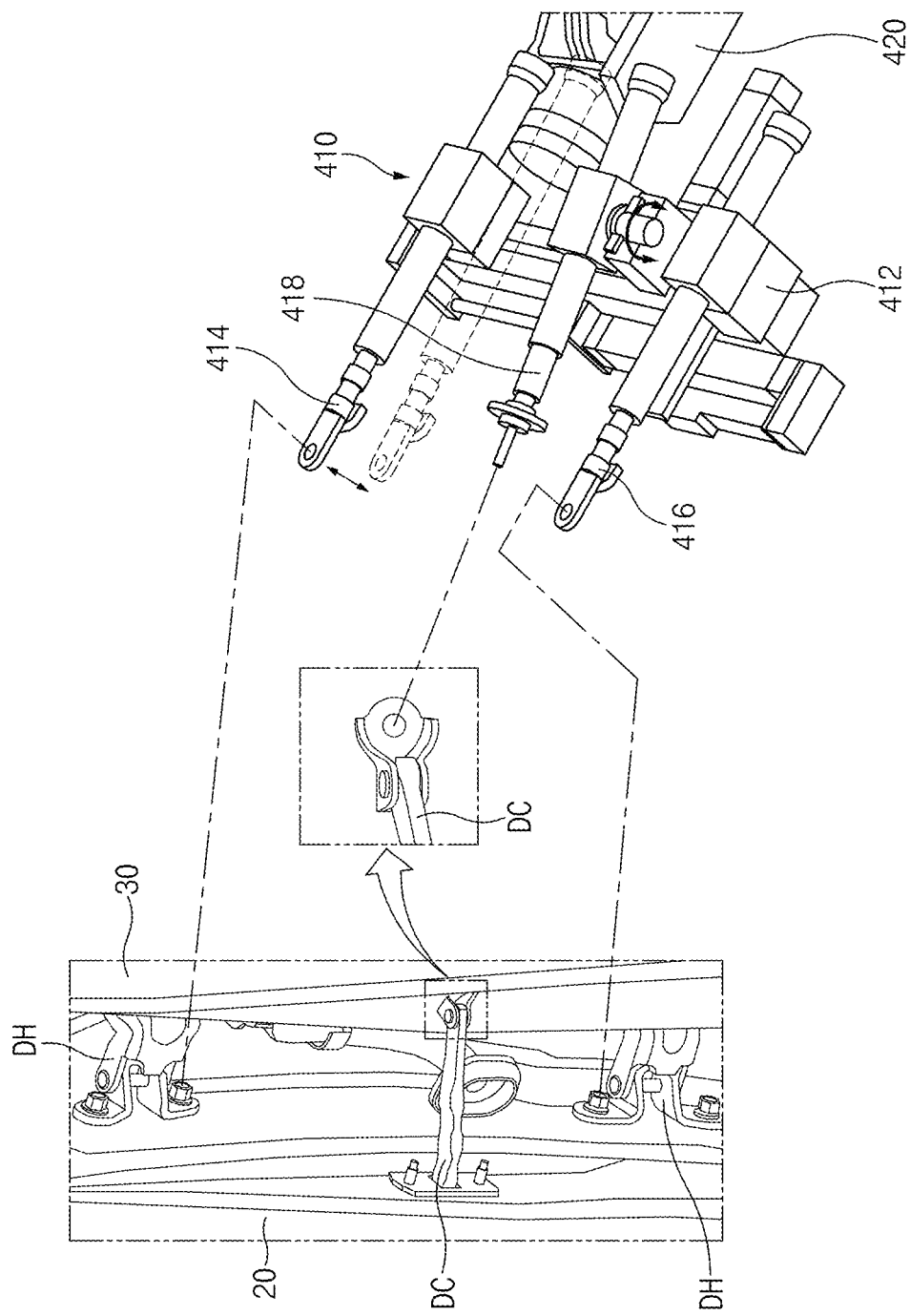
FIG. 13 is a view illustrating a door tool module of the system for assembling a door for a vehicle according to the embodiment of the present disclosure.

With reference to FIG. 13, according to an embodiment of the present disclosure, the fastening tool module 410 may include a base fastening frame 412 connected to the fastening tool transfer robot 420, a first fastening tool 414 provided on the base fastening frame 412, a second fastening tool 416 provided on the base fastening frame 412 and configured to be movable in a direction toward or away from the first fastening tool 414, and a third fastening tool 418 configured to be rotatable relative to the base fastening frame 412 to define a different fastening angle from the first fastening tool 414 or the second fastening tool 416.

For example, the process of structurally fastening the door 30 to the vehicle body 20 may be performed by fastening the door hinge DH first by using the first fastening tool 414 and the second fastening tool 416, and then fastening the door checker DC by using the third fastening tool 418.

Various tools capable of fastening a fastening bolt for a door hinge may be used as the first fastening tool 414 and the second fastening tool 416. The present disclosure is not restricted or limited by the types and structures of the first fastening tool 414 and the second fastening tool 416. For example, the first fastening tool 414 and the second fastening tool 416 may be used to simultaneously fasten the fastening bolts to the different door hinges.

Various tools capable of fastening a fastening bolt for a door checker may be used as the third fastening tool 418. The present disclosure is not restricted or limited by the type and structure of the third fastening tool 418.

The second fastening tool 416 may be configured to move rectilinearly in direction toward or away from the first fastening tool 414 by a driving source such as a cylinder (e.g., a servo-cylinder or pneumatic cylinder). The third fastening tool 418 may be configured to be rotated relative to the base fastening frame 412 (e.g., rotated within 10 degrees based on the fastening angle of the first fastening tool) by a driving source such as a cylinder (e.g., a rotary cylinder).

In particular, in order to ensure (e.g., sufficient) workspace while preventing interference between the fastening tools (the first to third fastening tools) and the peripheral component (e.g., the gripper or the connector fastening unit) during the fastening process using the fastening tool module 410, the base fastening frame 412 may be configured to selectively move rectilinearly in the forward/rearward direction (the direction perpendicular to the movement direction of the second fastening tool 416) by a driving source such as a cylinder.

In the embodiment of the present disclosure illustrated and described above, the example has been described in which the fastening tool module 410 includes the three fastening tools. However, according to another embodiment of the present disclosure, the fastening tool module may include four or more fastening tools or include two or fewer fastening tools.

According to another exemplary embodiment of the present disclosure, a fastening tool module 410' may be used to fasten a dual motion door hinge DMDH used for a coach door.

Figure 14:
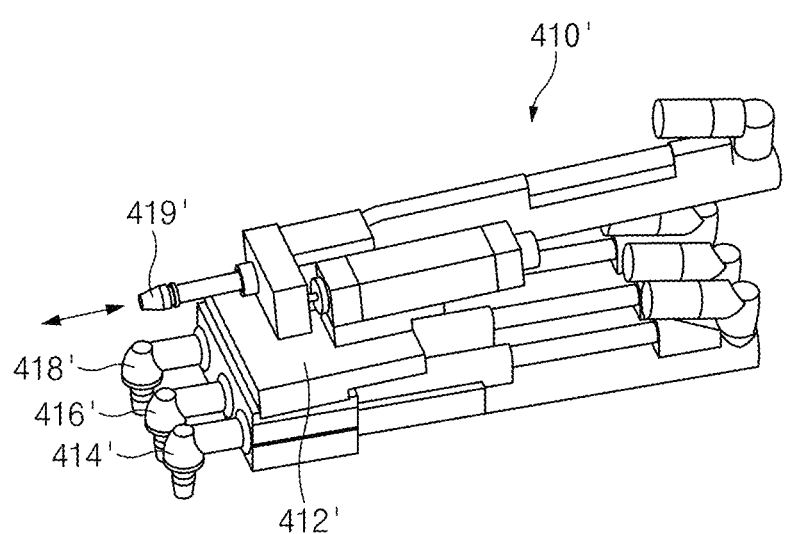
FIGS. 14 and 15 are views illustrating another embodiment of the door tool module of the system for assembling a door for a vehicle according to the embodiment of the present disclosure.
Figure 15:
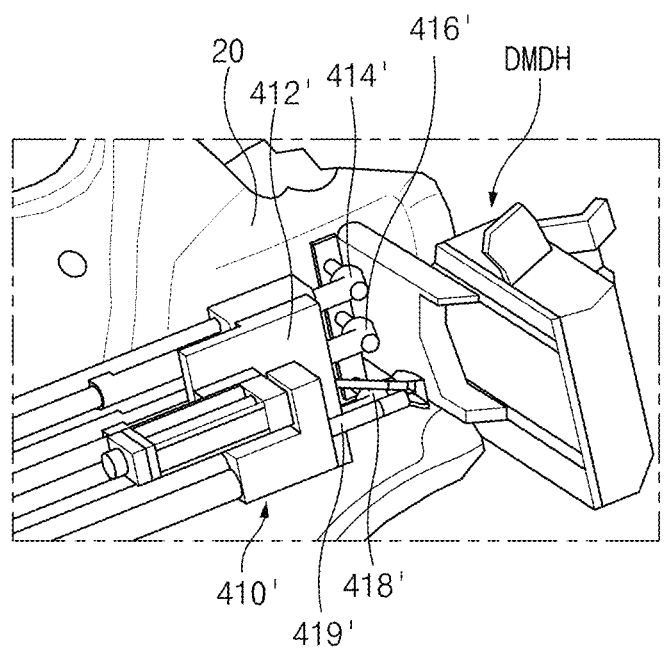

With reference to FIGS. 14 and 15, the fastening tool module 410' may include a base fastening frame 412' connected to the fastening tool transfer robot 420, a first fastening tool 414' provided on the base fastening frame 412, a second fastening tool 416' provided on the base fastening frame 412' and configured to define the same fastening angle as the first fastening tool 414', a third fastening tool 418' provided on the base fastening frame 412' and configured to define the same fastening angle as the first fastening tool 414', and a fourth fastening tool 419' rectilinearly movably provided on the base fastening frame 412' and configured to selectively protrude from the base fastening frame 412' while defining a different fastening angle from the first fastening tool 414'.

For example, the process of structurally fastening the door 30 to the vehicle body 20 may be performed by fastening the fastening bolt for the door hinge first by using the first to third fastening tools 414', 416', and 418', and then fastening the fastening bolt for the door checker by using the fourth fastening tool 419'.

Various tools capable of fastening the fastening bolt for the door hinge may be used as the first fastening tool 414', the second fastening tool 416', and the third fastening tool 418'. The present disclosure is not restricted or limited by the types and structures of the first fastening tool 414' and the second fastening tool 416'. For example, the first fastening tool 414', the second fastening tool 416', and the third fastening tool 418' may be used to simultaneously fasten the three fastening bolts for the door hinge.

Various tools capable of fastening the fastening bolt for the door checker may be used as the fourth fastening tool 419'. The present disclosure is not restricted or limited by the type and structure of the fourth fastening tool 419'. For example, the fastening angle of the fourth fastening tool 419' may be defined to be orthogonal to the fastening angle of the first fastening tool 414'.

Further, the fourth fastening tool 419' may be configured to moved rectilinearly by a stroke variation device, such as a cylinder (e.g., a servo-cylinder or a pneumatic cylinder), in a direction in which the fourth fastening tool 419' protrudes from the base fastening frame 412' (a longitudinal direction of the fourth fastening tool).

The fastening tool transfer robot 420 is configured to transfer the fastening tool module 410 while corresponding to the portion where the door 30 is fastened to the vehicle body 20.

A typical multi-axis robot capable of transferring the fastening tool module 410 in the X-axis direction, the Y-axis direction, and the Z-axis direction may be used as the fastening tool transfer robot 420. The present disclosure is not restricted or limited by the type and structure of the fastening tool transfer robot 420.

According to the present disclosure described above, it is possible to obtain an advantageous effect of automating the process of assembling the door and improving productivity and production efficiency.

In particular, according to the embodiments of the present disclosure, it is possible to obtain an advantageous effect of ensuring the positional precision of the door and automating the process of assembling the door even though the door hanger is deformed and the cumulative dispersion is increased.

Among other things, according to the embodiments of the present disclosure, it is possible to obtain an advantageous effect of optimizing the orientations of the door during removing (e.g., gripping) and loading the door and improving the precision in assembling the door even when the door hanger is deformed and the cumulative dispersion is increased.

In addition, according to the embodiments of the present disclosure, it is possible to obtain an advantageous effect of standardizing and automating the process of assembling the door without being restricted by the type (e.g., shape) and structure of the door.

In addition, according to the embodiments of the present disclosure, it is possible to automate the process of fastening the door connector and the process of structurally fastening the door to the vehicle body.

In addition, according to the embodiments of the present disclosure, it is possible to obtain an advantageous effect of simplifying the structure and the manufacturing process and improving the spatial utilization and the degree of design freedom.

In addition, according to the embodiments of the present disclosure, it is possible to obtain an advantageous effect of reducing the manufacturing costs and shortening the time required for the process of assembling the door.

In addition, according to the embodiments of the present disclosure, it is possible to obtain an advantageous effect of preventing the door from being erroneously assembled, reducing a defect rate, and improving stability and reliability.

While several embodiments have been described above, the embodiments are merely illustrative and are not intended to limit the present disclosure. It should be appreciated by those of ordinary skill in the art that various modifications to and various different applications of the embodiments, which are not described above, may be made to the embodiments described herein without departing from the intrinsic features of the embodiments described herein and the inventive concept of the present disclosure. For example, the respective constituent elements specifically described in the embodiments may be modified and applied to the embodiments described herein. Further, it should be interpreted that the differences related to the modifications and applications are included in the scope of the present disclosure defined by the appended claims.

What is claimed is:

1. A system for assembling a door for a vehicle, the system comprising:
   a door hanger configured to supply a door to be coupled to a vehicle body;
   a first alignment part provided on the door hanger and configured to align the door in a first reference orientation preset based on a longitudinal direction of the vehicle body; and
   a transfer unit configured to remove the door from the door hanger and transfer the door to the vehicle body, wherein the first alignment part comprises:
      a first support member configured to support a first lateral end of the door at a longitudinal reference position preset based on the longitudinal direction of the vehicle body; and
      a second support member configured to be movable toward or away from a second lateral end of the door in the longitudinal direction of the vehicle body and support the second lateral end of the door, and
   wherein the first lateral end of the door is aligned at the longitudinal reference position as the door is pressed by the second support member.

2. The system of claim 1, wherein the first support member and the second support member are configured to be selectively movable upward or downward in a vertical direction.

3. The system of claim 1, wherein the first alignment part aligns the door in the first reference orientation in a state in which the door is moved by the transfer unit to a preset reference height relative to the door hanger.

4. The system of claim 1, wherein the transfer unit comprises:
   a gripper configured to grip the door; and
   a gripper transfer robot configured to transfer the gripper, which grips the door, to the vehicle body.

5. The system of claim 4, wherein the gripper comprises:
   a lower end grip part configured to support a lower end of the door; and
   an upper end grip part configured to support an upper end of the door.

6. The system of claim 5, wherein the lower end grip part comprises a mounting block on which the lower end of the door is mounted, and the upper end grip part comprises a suction member configured to suck a door glass of the door.

7. The system of claim 4, comprising:
   a second alignment part provided on the gripper and configured to align the door in a second reference orientation preset based on a width direction of the vehicle body.

8. The system of claim 7, wherein the second alignment part comprises:
   a support protrusion provided on the gripper and configured to support an outer surface of a lower end of the door at a widthwise reference position preset based on the width direction of the vehicle body; and
   a pressing member configured to be movable toward or away from an inner surface of the door in the width direction of the vehicle body and press an inner surface of the lower end of the door, and
   wherein the outer surface of the lower end of the door is aligned at the widthwise reference position as the door is pressed by the pressing member.

9. The system of claim 4, comprising:
   a connector fastening unit provided on the gripper and configured to fasten a door connector, which is provided on the door, to a vehicle body connector provided on the vehicle body.

10. The system of claim 9, comprising:
    a connector holder provided on the door hanger and configured to support the door connector in a preset connector reference orientation,
    wherein the connector fastening unit is configured to remove the door connector from the connector holder and fasten the door connector to the vehicle body.

11. The system of claim 10, wherein the connector fastening unit comprises:
    a connector gripper configured to grip the door connector; and
    a connector transfer part configured to transfer the connector gripper, which grips the door connector, from the connector holder to the vehicle body connector.

12. The system of claim 11, wherein the connector gripper comprises:
   a first grip part configured to support a first end of the door connector; and
   a second grip part configured to be movable toward or away from a second end of the door connector and support the second end of the door connector.

13. The system of claim 11, wherein the connector gripper is provided on a base connector frame, and
   wherein the connector transfer part comprises:
   a first cylinder configured to move the base connector frame in a first direction relative to the gripper;
   a second cylinder configured to move the base connector frame in a second direction intersecting the first direction; and
   a movement cylinder configured to move the base connector frame so that the door connector is inserted into the vehicle body connector.

14. The system of claim 13, wherein the connector transfer part comprises a lifting cylinder configured to move the base connector frame upward or downward in a vertical direction.

15. The system of claim 13, comprising:
   a locking frame provided on the base connector frame and configured to be movable upward or downward and lock a locking pin of the door connector to the vehicle body connector.

16. The system of claim 1, comprising:
   a door fastening unit configured to fasten the door to the vehicle body.

17. The system of claim 16, wherein the door fastening unit comprises:
   a fastening tool module configured to structurally fasten the door and the vehicle body; and
   a fastening tool transfer robot configured to transfer the fastening tool module while corresponding to a portion where the door is fastened to the vehicle body.

18. The system of claim 17, wherein the fastening tool module comprises:
   a base fastening frame connected to the fastening tool transfer robot;
   a first fastening tool provided on the base fastening frame;
   a second fastening tool provided on the base fastening frame and configured to be movable toward or away from the first fastening tool; and
   a third fastening tool rotatably provided on the base fastening frame and configured to define a different fastening angle from the first fastening tool or the second fastening tool.

19. The system of claim 17, wherein the fastening tool module comprises:
   a base fastening frame connected to the fastening tool transfer robot;
   a first fastening tool provided on the base fastening frame;
   a second fastening tool provided on the base fastening frame and configured to define the same fastening angle as the first fastening tool;
   a third fastening tool provided on the base fastening frame and configured to define the same fastening angle as the first fastening tool; and
   a fourth fastening tool configured to move rectilinearly provided on the base fastening frame and configured to selectively protrude from the base fastening frame while defining a different fastening angle from the first fastening tool.

20. A system for assembling a door for a vehicle, the system comprising:
   a door hanger configured to supply a door to be coupled to a vehicle body;
   a first alignment part provided on the door hanger and configured to align the door in a first reference orientation preset based on a longitudinal direction of the vehicle body;
   a transfer unit configured to remove the door from the door hanger and transfer the door to the vehicle body, wherein the transfer unit comprises:
      a gripper configured to grip the door, and
      a gripper transfer robot configured to transfer the gripper, which grips the door, to the vehicle body; and
   a connector fastening unit provided on the gripper and configured to fasten a door connector, which is provided on the door, to a vehicle body connector provided on the vehicle body.

* * * * *